US006542969B1

(12) United States Patent
Sato

(10) Patent No.: US 6,542,969 B1
(45) Date of Patent: Apr. 1, 2003

(54) MEMORY CONTROLLER AND A CACHE FOR ACCESSING A MAIN MEMORY, AND A SYSTEM AND A METHOD FOR CONTROLLING THE MAIN MEMORY

(75) Inventor: Taizo Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/332,883

(22) Filed: Jun. 15, 1999

(30) Foreign Application Priority Data

Dec. 28, 1998 (JP) ............................................ 10-371903

(51) Int. Cl.⁷ .............................................. G06F 12/00
(52) U.S. Cl. ........................ 711/143; 711/105; 711/159
(58) Field of Search .............................. 711/5, 141, 143, 711/144, 159, 105

(56) References Cited

U.S. PATENT DOCUMENTS 5,247,648 A * 9/1993 Watkins et al.
5,590,379 A * 12/1996 Hassler et al.
6,272,594 B1 * 8/2001 Gupta et al. ................. 711/127

* cited by examiner

Primary Examiner—Jack A. Lane
(74) Attorney, Agent, or Firm—Arent Fox Kintner Plotkin & Kahn, PLLC

(57) ABSTRACT

A memory control system has a replacement detection/notification circuit for detecting occurrence of replacement of dirty entry in a cache and informing a memory controller of the detection, and a state control circuit for precharging the currently active page in a main memory when the memory controller is informed of the detection and a preceding access to the main memory attendant upon the replacement of dirty entry is completed. By precharging the active page in the main memory to return to the idle state when the preceding access attendant upon the replacement of dirty entry is completed, the succeeding access can be done only by activating the aimed page probably different from the above page. It is thereby obviated to return the activated page due to the preceding access to the idle state after a page miss occurs in the succeeding access.

20 Claims, 12 Drawing Sheets

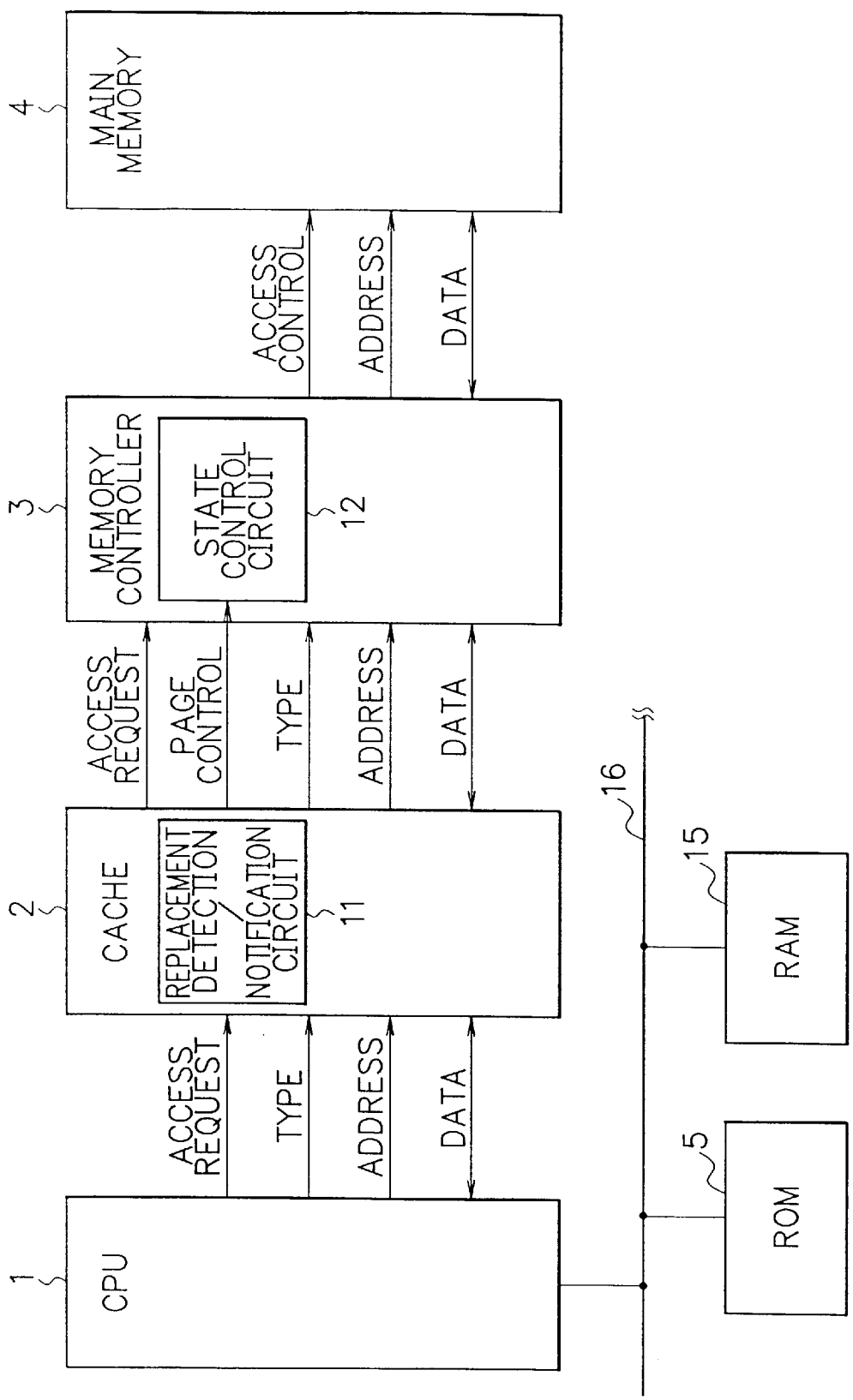

MEMORY CONTROLLER AND A CACHE FOR ACCESSING A MAIN MEMORY, AND A SYSTEM AND A METHOD FOR CONTROLLING THE MAIN MEMORY

BACKGROUND OF THE INVENTION

1. Field of the Invention

The present invention relates to a memory controller, a cache device, a memory control system, a memory control method, and a recording medium, particularly to a technique for controlling a storage device in which data I/O is made fast.

2. Description of the Related Art

In recent years, as the clock speeds of CPUs in computer systems become higher or the processing speeds of various other electronic circuits become higher, high-speed interfaces are required. For this purpose, by exploiting the fact that addresses of a storage device successively output from a CPU are mostly near to each other, DRAMs (Dynamic Random Access Memories) after a high-speed DRAM use a function of keeping an area, which has been activated in a memory cell array, active for a while to achieve the faster subsequent access to the area.

FIG. 1 shows a schematic arrangement of a DRAM. Referring to FIG. 1, a memory cell array 35 comprises a plurality of word lines, a plurality of bit lines perpendicular to the word lines, and a plurality of memory cells located at the intersections of the word and bit lines. Upper bits of an address externally input to an address buffer 31 indicate a row address, and lower bits thereof indicate a column address. The row address is held in a row address buffer 32, and the column address is held in a column address buffer 33.

The row address held in the row address buffer 32 is decoded by a row decoder 34 to select one word line in the memory cell array 35. In a readout operation, data in the respective memory cells connected to the selected word line are read out onto the corresponding bit lines as small voltages, which are amplified by a sense amplifier 36.

The column address held in the column address buffer 33 is decoded by a column decoder 37 to open the column gate for one bit line corresponding to the decoded column address. Data on the thus selected bit line is output onto a common line 40 through the opened column gate. In a readout operation, the thus obtained data DQ is externally output through a data I/O buffer 38.

In a writing operation, data DQ externally input through the data I/O buffer 38 is supplied to a bit line in the memory cell array 35 through the common line 40 and the corresponding column gate selected according to a given column address. The data is written in a memory cell on the intersection of the bit line and a word line selected according to a given row address.

The above-mentioned elements 31 to 38 are under control of a control circuit 39. The control circuit 39 is externally supplied with a row address strobe signal /RAS, a column address strobe signal /CAS, and a write enable signal /WE. Note that an inverted signal expressed by a signal name with an overline in FIG. 1 (and FIGS. 7 to 10) will be expressed by attaching symbol "/" to the signal name in the specification.

In this type of DRAM, successive accesses for readout and writing (read/write) are mostly done to addresses near to each other. After completion of an access to a row address, the same row address is more likely to be accessed next. For this reason, when there arises no necessity to make an access to a different row address, a word line selected according to a row address is kept active so that the subsequent accesses can be made by selecting a column address only. A faster access is thereby attained.

In order to use such a function more effectively, a recent memory controller controls a block of a predetermined size (one word line) to be kept active even after data in the block was accessed according to a given address, so as to be able to respond faster when the same block is successively accessed. The unit size for such a block is called "page", and there is a case that a DRAM utilizing this function is called "fast page DRAM".

On the other hand, it is a common practice for recent computer systems to insert a cache memory, which is composed of memory elements faster than those of a main memory, between a CPU and the main memory for the reason that data once accessed is more likely to be accessed again in the near future. More specifically, once accessed data in the main memory is registered in the cache memory, and, when the same data is accessed next, it is read out from not the main memory but the cache memory. The access speed to the main memory is thereby apparently increased.

In this computer system with the cache memory, when an access request to data in the main memory is issued, the cache memory is first referred to. If the requested data is present in the cache memory (cache hit), the data is immediately transferred to a CPU. If the requested data is not present in the cache memory (cache miss), a block of an appropriate size including the requested data is read out from the main memory, and stored in the cache memory. At this time, if no empty block is available in the cache memory, a block that is least likely to be used again is selected and replaced by the new data.

Cache memories are roughly classified into store-through type and store-back type. In the store-through type, when the cache contents are rewritten, the main memory contents are always rewritten accordingly, so that the latest data are surely stored also in the main memory. Contrastingly in the store-back type, only the cache contents are rewritten, and, when a block is to be re-assigned due to a cache miss, the latest contents of the cache memory is written back to the main memory. In case of the store-back type, there is therefore a case that the contents of the cache memory differ from those of the corresponding part of the main memory.

In the store-back type, the area in the cache memory where only cache contents have been rewritten is called "dirty entry". When blocks are re-assigned, as to a block including no dirty entry, the corresponding block can be simply loaded from the main memory. As to a block including a dirty entry, however, its contents must be written out to the corresponding block in the main memory, and then another block in the main memory is assigned to the block in the cache memory. Such an operation is called "replacement of dirty entry".

In recent years, as CPUs become faster and cache capacities become larger, the store-through type that must frequently access a main memory is being replaced by the store-back type that must less frequently access the main memory. This is because the access speed to a memory is often considered an important factor of the performance of a data processing system.

FIG. 2 shows a schematic arrangement of a cache memory. As shown in FIG. 2, the cache memory generally comprises a cache (data area) 41 for storing some data stored in a main memory, and a tag memory (tag area) 42 for storing a part of the address (tag) on the main memory corresponding to each of the data stored (as entries) in the cache 41.

Since the cache 41 has a smaller capacity than the main memory, the addresses corresponding to respective entries in the cache 41 are registered in the tag memory 42. The address of data requested by an access request from a CPU is compared with each of the registered addresses in the tag memory 42. A cache hit or miss is determined by judging whether or not the address of the requested data coincides with one of registered addresses in the tag memory 42, i.e., whether the requested data is present in the cache 41 or not.

In this case, however, huge-size hardware is required if the address of the requested data is straightly compared with all of the entries in the cache 41, i.e., all of the tags in the tag memory 42. For this reason, the following scheme (set associative memory scheme) is used in general. Entries having lower bits equal to those (INDEX) of the address attendant upon the access request are selected from among all entries in the cache 41, and then the address is compared with the tags of only the selected entries in a comparator 43. Using the lower bits of the address attendant upon the access request is because of intensive localization of successive access requests from the CPU. Successive accesses are apt to concentrate in a narrow range of addresses.

The same applies to memory control of such a fast page DRAM as described above. More specifically, a row address of the DRAM is assigned to an upper address portion, and a column address is assigned to a lower address portion, so that successive access requests have an identical row address (page hit) with high probability. When a page hit occurs, the subsequent access is controlled only with output a column address while the hit page is kept active (page access scheme). The access speed increases because no row address need be output.

When a recently prevalent store-back cache memory is connected to a memory controller for a conventional fast page DRAM, however, the following problem arises. When a main memory is accessed for performing a replacement of dirty entry in the store-back cache memory, successive access requests having an identical lower address but different upper addresses are made with high probability, and, in most cases, page misses occur in the main memory.

When either of the successive access requests result in a page hit, faster accesses can be assured. But, when a page miss arises in successive access requests due to a difference in row address, overhead arises in the subsequent access, in which the page having been selected according to the preceding access is precharged to return from the active state to the non-activated state (called idle state) before the aimed page is activated.

In a memory controller for a synchronous DRAM (SDRAM: Synchronous Dynamic Random Access Memory), the overhead ratio is especially high because of a high-speed interface. When a benchmark test was performed in which the run time of a standard program with frequent accesses to different memory areas was measured using such an SDRAM memory controller and a store-back cache memory, nearly 20% overhead was observed. When overhead arises, the access speed lowers accordingly.

FIG. 3 is a flow chart showing the flow of page control in a conventional memory controller. Referring to FIG. 3, after a DRAM is reset (step S1), it is in the idle state in which none of word lines is selected (step S2). If an access request is given by a CPU (step S3), one word line (page) is selected according to a row address attendant upon the access request, and activated (step S4). One bit line is then selected according to a column address attendant upon the access request, and a read/write operation is performed. After that, the selected page is kept active.

If no access request is given by the CPU in the step S3, it is checked whether the DRAM is to be refreshed or not (step S8). If NO in the step S8, the flow returns to the step S2 to wait for an access request. Otherwise, the DRAM is refreshed (step S11).

Also in case that no access request is given by the CPU while a page is active (step S5), it is checked whether the DRAM is to be refreshed or not (step S9). If NO in the step S9, the flow returns to the step S4 to wait for an access request. If it is judged in the step S9 that the DRAM is to be refreshed, the currently selected page is precharged (step S10), and then the DRAM is refreshed (step S11).

If an access request is given by the CPU in the step S5, a page hit or miss is judged by checking whether or not the row address attendant upon the access request is the same as the row address given the last time (step S6). In case of page hit, the flow returns to the step S4 to keep the page corresponding to the row address active, and a read/write operation is immediately performed according to the column address attendant upon the access request.

In case of page miss in the step S6, the currently selected page is precharged (step S7) to return from the active state to the idle state (step S2). After that, the flow advances to the step S4 via the step S3 to activate another page. That is, in case of page miss, overhead arises that the currently selected page must be returned from the active state to the idle state before another page is activated.

SUMMARY OF THE INVENTION

It is an object of the present invention to attain a more faster access speed to a memory having a fast page function that the page activated according to an access is kept in the active state after that so as to make the subsequent access to the same page faster, by obviating the necessity of resetting the page from the activated state to the idle state when a page miss occurs.

A memory controller according to the present invention is for controlling access to a main memory. The controller has a mode for keeping the accessed page in the main memory active even after the access is completed, and comprises state control circuit for controlling to precharge the accessed page in the main memory to return to the idle state upon completion of preceding access on condition that access to the main memory is attendant upon a replacement of dirty entry in a cache device.

A store-back cache device according to the present invention comprises detection/notification circuit for detecting occurrence of replacement of dirty entry, and sending a signal to a controller of a main memory. The signal indicates whether or not the current access to the main memory is attendant upon the replacement of dirty entry.

A memory control system according to the present invention substantially comprises the above memory controller and the above cache device.

When an access to the main memory is done for a replacement of dirty entry in the cache device, the succeeding access to the main memory highly probably results in a page miss. According to the present invention, however, since the active page in the main memory is precharged to return to the idle state upon completion of preceding access before the succeeding access attendant upon the replacement of dirty entry is completed, the succeeding access can be done only by activating the aimed page in the idle state. It is thereby obviated to return the activated page due to the preceding access to the idle state after a page miss occurs in the succeeding access.

A memory controller according to another aspect of the present invention is for controlling access to a plurality of main memories. The controller has a mode for keeping the accessed page in one of the main memories active even after the corresponding access is completed, and comprises state control circuit for controlling to precharge the accessed page in one of the main memories to return to the idle state upon completion of preceding access on condition that successive accesses attendant upon a replacement of dirty entry in a cache device are made to the same one of said main memories.

A store-back cache device according to another aspect of the present invention comprises detection/notification circuit for detecting occurrence of replacement of dirty entry in a cache and a condition that successive accesses attendant upon the replacement are made to the same one of a plurality of main memories, to send a signal to a controller of the main memories. The signal indicates whether or not the current access to the one of the main memories is attendant upon the replacement of dirty entry.

A memory control system according to another aspect of the present invention substantially comprises the above second memory controller and the above second cache device.

According to the second aspect of the present invention, even when a dirty entry is replaced, if successive accesses attendant upon the replacement of dirty entry are made to different main memories, respectively, control is made not to precharge the active page in the earlier accessed main memory.

Even in accessing for a replacement of dirty entry in the cache device, if different main memories are to be successively accessed, a page miss hardly occurs at that time. So, according to the present invention, when different main memories are successively accessed, precharging is not performed. Unnecessarily precharging can be avoided thereby.

According to still another aspect of the present invention, when a signal indicating whether the present access is attendant upon a replacement of dirty entry or not is sent from the cache device to the memory controller, the signal is included in a signal for indicating a type of access to the main memory.

According to this aspect of the present invention, the signal can be sent using an existing signal line without providing any dedicated signal line.

BRIEF DESCRIPTION OF THE DRAWINGS

FIG. 12 is a schematic block diagram showing another example of a computer system which comprises a memory controller and a cache device according to the present invention.

DETAILED DESCRIPTION OF THE PREFERRED EMBODIMENTS

Embodiments of the present invention will be described hereinafter with reference to the accompanying drawings.

Figure 4:
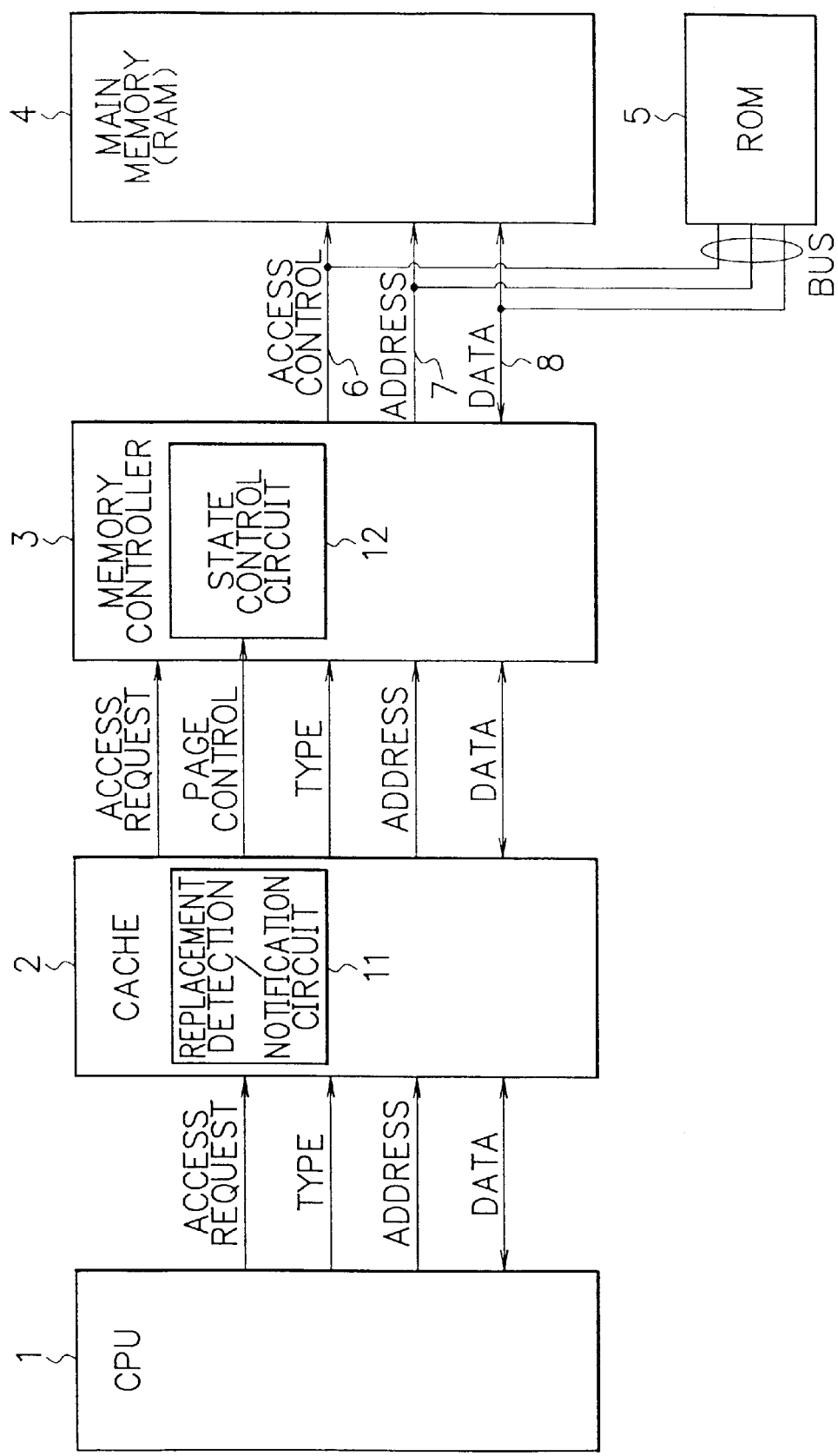
FIG. 4 is a schematic block diagram showing an example of the arrangement of a computer system which comprises a memory controller and a cache device according to the present invention.

FIG. 4 is a schematic block diagram showing the arrangement of a memory control system (computer system) that comprises a memory controller and a cache device according to the first embodiment of the present invention. Referring to FIG. 4, a CPU 1 is a central processing unit for executing various commands on the basis of a control program supplied from a ROM 5, RAM 4, or the like via an access control line 6, an address line 7, and a data line 8 of a bus.

The CPU 1 outputs an access request to a main memory 4, a type signal indicating the types (type of read/write, type of access to a unit of data or access to a data block, etc.) of the access request, and an address signal, and inputs or outputs data in accordance with those signals. The access request to the main memory 4 is issued via a cache memory 2. This is because the access response speed of the main memory 4 with a large capacity is relatively low, and so a copy of data is stored in the high-speed cache memory 2 to attain a faster access response.

Figure 1:
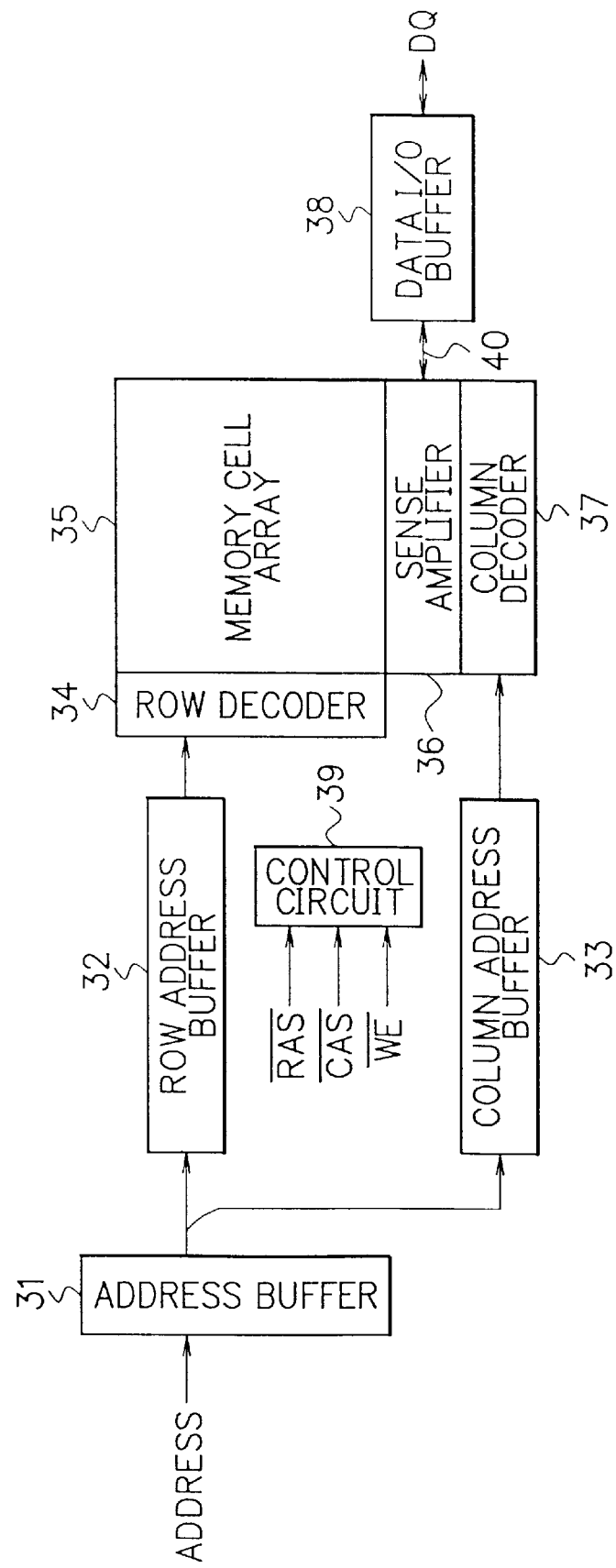
FIG. 1 is a schematic block diagram showing the arrangement of a DRAM.

The main memory 4 is a storage device such as an SDRAM with a fast page mode having the arrangement shown in FIG. 1 for example. The cache memory 2 is a temporary storage device (buffer storage device) having a smaller capacity than the main memory 4, and composed of memory elements of higher speed than those of the main memory 4.

In recent years, as the cache capacity increases, the store-back type of cache memory is used also in the field of microcontrollers in place of the store-through type. Also in this embodiment, a store-back memory is used as the cache memory 2. The cache memory 2 of this embodiment has the arrangement shown in FIG. 2, and uses a set associative memory scheme in which entries are selected with lower bits of a given address, and the given address is compared with only the addresses corresponding to the selected entries.

A memory controller 3 is a block for converting an access request from the cache memory 2 into an access protocol for the main memory 4. This memory controller 3 outputs access control signals such as a row address strobe signal /RAS, a column address strobe signal /CAS, and a write enable signal /WE (see FIGS. 7 to 9) to the main memory 4. The reason why the memory controller 3 is constructed as a separate block from the cache memory 2 is that various types of memories can be selectively used as the main memory 4 by changing the type of memory controller 3.

In this arrangement, when the CPU 1 issues an access request to data in the main memory 4, it is first checked whether a copy of the data is present in the cache memory 2 or not. When the copy is present (cache hit), the access can be completed only by communicating with the cache memory 2. In many cases, the CPU 1 will repetitively generate access requests to the once accessed data (command) in the near future. In that case, the cache hit probability becomes high, and faster access for data I/O can be attained.

When there is no copy of the data corresponding to the access request in the cache memory 2 (cache miss), the cache memory 2 sends the access request to the memory controller 3. The memory controller 3 thereby actually accesses the main memory 4 to read out the requested data. At this time, a block of an appropriate size including the requested data is read out from the main memory 4, and registered in an entry of the cache memory 2.

In the cache memory 2 that uses the store-back scheme and set associative memory scheme, when a dirty entry is to be replaced due to a cache miss, the contents of the dirty entry in the cache memory 2 must be written out into the main memory 4. As a result, read and write accesses with a set of addresses (called set address) are successively made.

Figure 5:
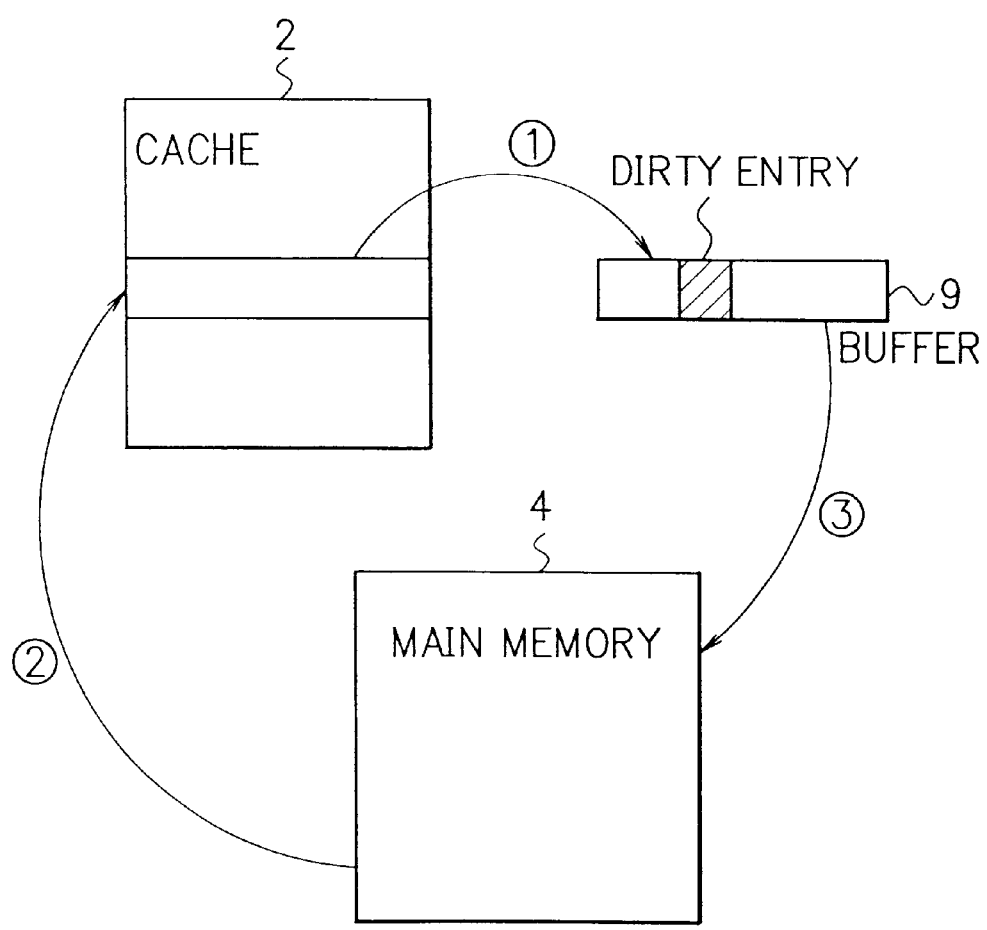
FIG. 5 is an imaginary view for illustrating the operation of a replacement of dirty entry.

More specifically, the dirty entry must be replaced in the process of (1) to (3) shown in FIG. 5 by the corresponding numbers circled. Data of a predetermined block including a dirty entry is read out from the cache memory 2, and saved temporarily in a buffer 9 ((1)). The data corresponding to the access request given at that time is then read out from the main memory 4, and a block including the data is registered in the area in the cache memory 2 where the dirty entry was present ((2)). After that, the contents of the dirty entry temporarily saved in the buffer 9 are written in the main memory 4 ((3)).

Figure 2:
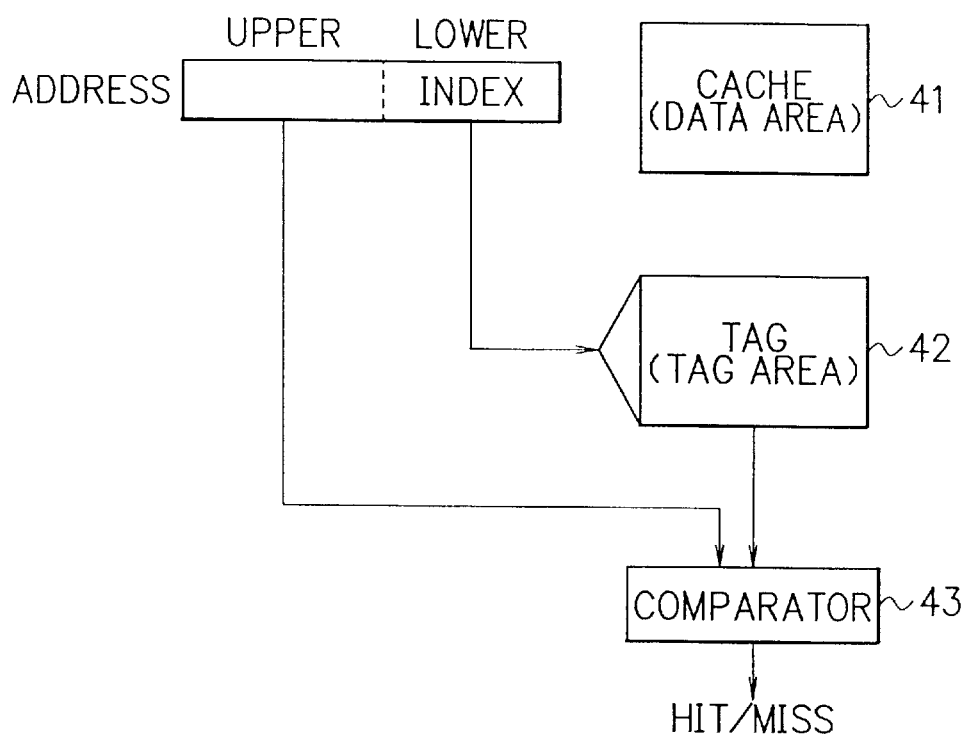
FIG. 2 is a schematic block diagram showing the arrangement of a cache memory.

In the set associative memory scheme, as shown in FIG. 2, entries are selected by using a lower address attendant upon the given access request as a key, and an upper address attendant upon the access request is compared with those of the addresses corresponding to the selected entries to judge a cache hit or miss. Hence, when a replacement of dirty entry is performed due to a cache miss, successive addresses given for accessing the main memory 4 for the replacement highly probably have identical lower bits but different upper bits.

That is, when a replacement of dirty entry is performed, read and write accesses with a set of addresses having an identical lower address but different upper addresses are successively generated. Such an identical lower address but different upper addresses cause a page miss in the main memory 4 due to the difference in row address between two successive accesses.

In short, when a cache miss has occurred in the cache memory 2 in response to a given access request from the CPU 1 and a dirty entry in the cache is; replaced, a page miss occurs with very high probability, in the main memory 4 in subsequent accesses attendant upon the replacement.

In this embodiment, as shown in FIG. 4, the store-back cache memory 2 is provided with a replacement detection/ notification circuit 11, which detects a replacement of dirty entry, and gives the memory controller 3 a page control signal indicating whether the current access is attendant upon the replacement or not. The replacement detection/ notification circuit 11 outputs an internal state signal indicating whether a replacement of dirty entry is performed or not, to the memory controller 3 outside the cache memory 2 as a page control signal in synchronism with the corresponding access.

The memory controller 3 comprises a state control circuit 12 to make control for setting the respective memory cells in the main memory 4 active or idle. When the state control circuit 12 receives from the replacement detection/ notification circuit 11 a page control signal indicating that the current access is attendant upon a replacement, the state control circuit 12 makes control for returning the currently active page in the main memory 4 to the idle state by precharging immediately when the preceding access attendant upon the replacement is completed.

Since the main memory 4 is accessed only after a cache miss occurs, a replacement of dirty entry due to a cache miss can be detected prior to a page miss that may occur at the time of accessing the main memory 4. So, in successive accesses attendant upon a replacement of dirty entry, when the preceding access is completed, the currently active page in the main memory 4 is immediately precharged so that the succeeding access can be made only by activating the aimed page in the idle state.

According to this embodiment, when a page miss occurs in the main memory 4, it is possible to avoid overhead that the currently active page is precharged to return to the idle state before activating another page. For example, as a result of a benchmark test like that for the prior art, overhead can be suppressed to about 10%.

Figure 3:
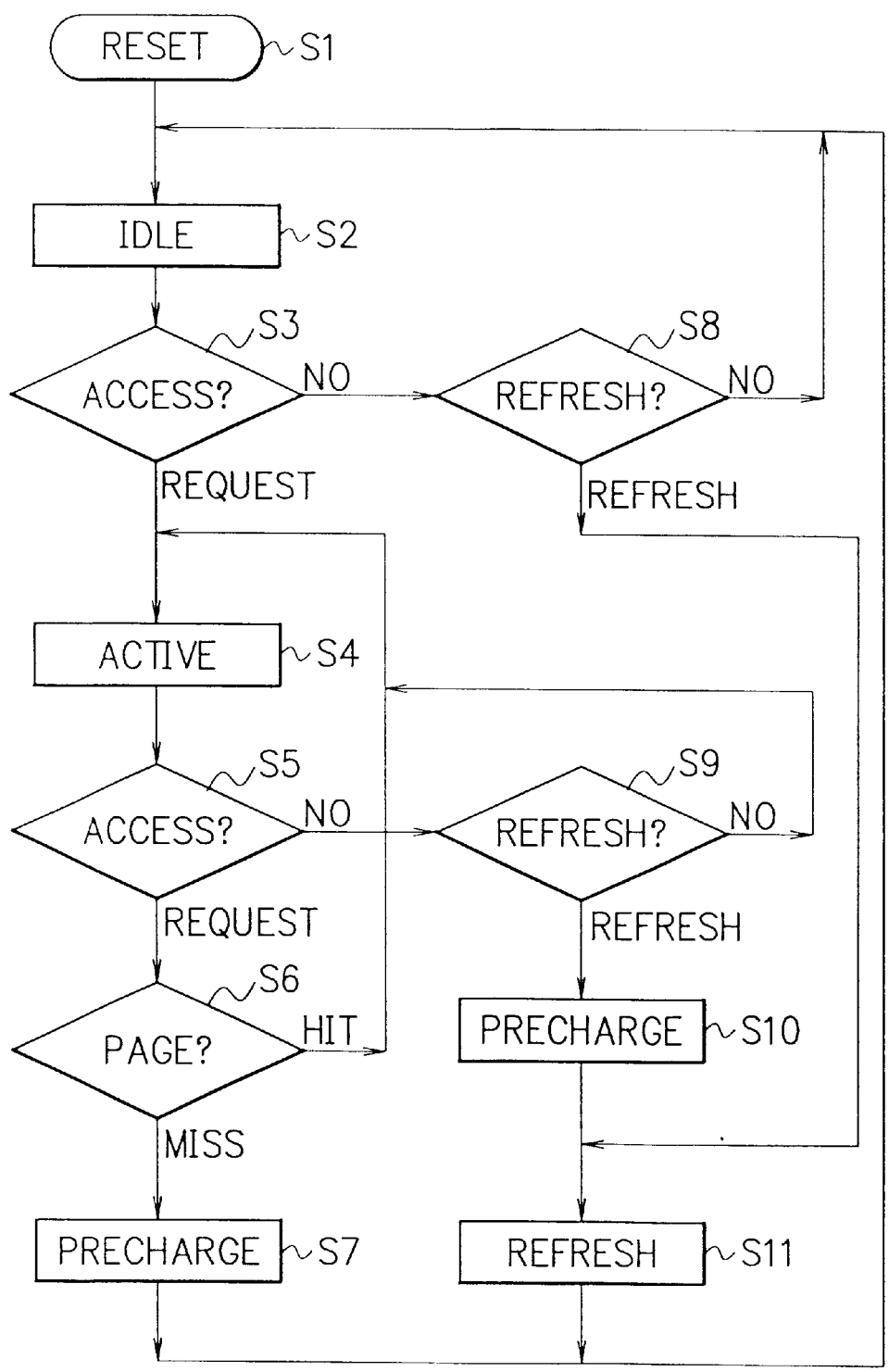
FIG. 3 is a flow chart showing the flow of page control by a conventional memory controller.
Figure 6:
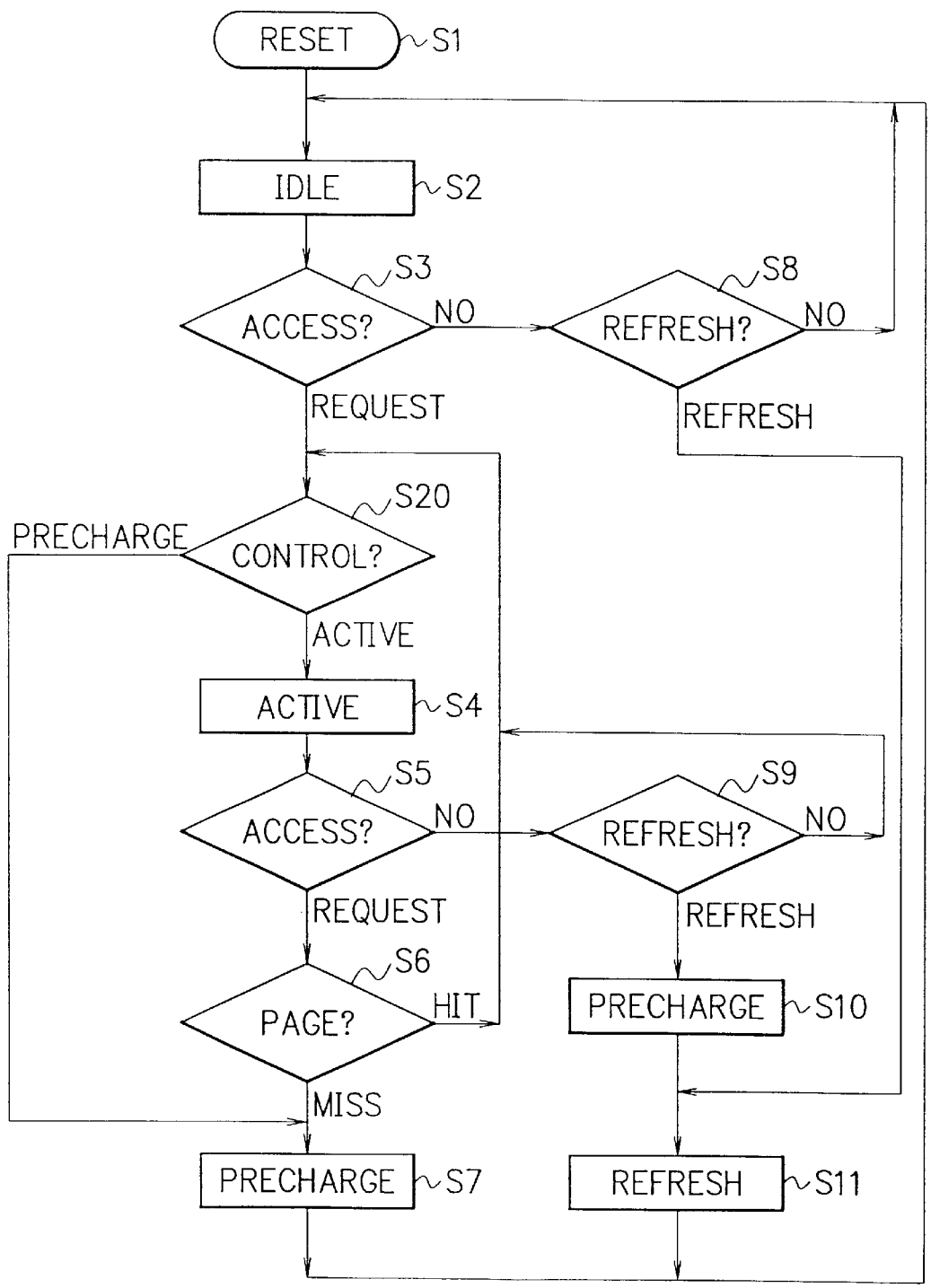
FIG. 6 is a flow chart showing the flow of page control by the memory controller according to the first embodiment of the present invention.

FIG. 6 shows the control flow of the memory controller 3 in this case. The difference from the control flow of the conventional memory controller shown in FIG. 3 is that the process of a step S20 is inserted between the steps S3 and S4 to check whether or not a page control signal, i.e., a dirty entry replacement detection signal is supplied from the replacement detection/notification circuit 11 in the cache memory 2, and to make the flow jump to the step S7 to precharge when the signal is supplied.

In this embodiment, when an access to the main memory 4 is completed, the accessed page is not unconditionally kept in the active state but it can be selected whether the page is kept in the active state or precharged to return to the idle state, in accordance with a page control signal from the cache memory 2. When a page miss occurs, the prior art has need of three processes, i.e., inactivation of the lately accessed page by precharging, activation of another page by outputting a row address, and output of a column address. In this embodiment, the necessity of precharging the lately accessed page can be obviated because precharging it had been done before the page miss occurs in practice.

Note that the memory controller 3 may be controlled as follows. When an access to the main memory 4 is made due to a cache miss, the accessed page at that time is unconditionally precharged after the access is completed. In this method, however, the fast page mode of the main memory 4 cannot be used effectively. That is, in the method of unconditionally precharging the accessed page after completion of the access, the process of page activation must always be done even in case of an access other than that attendant upon a replacement of dirty entry. This results in lowering the access speed. The control of this embodiment as described above is therefore preferable.

Figure 7:
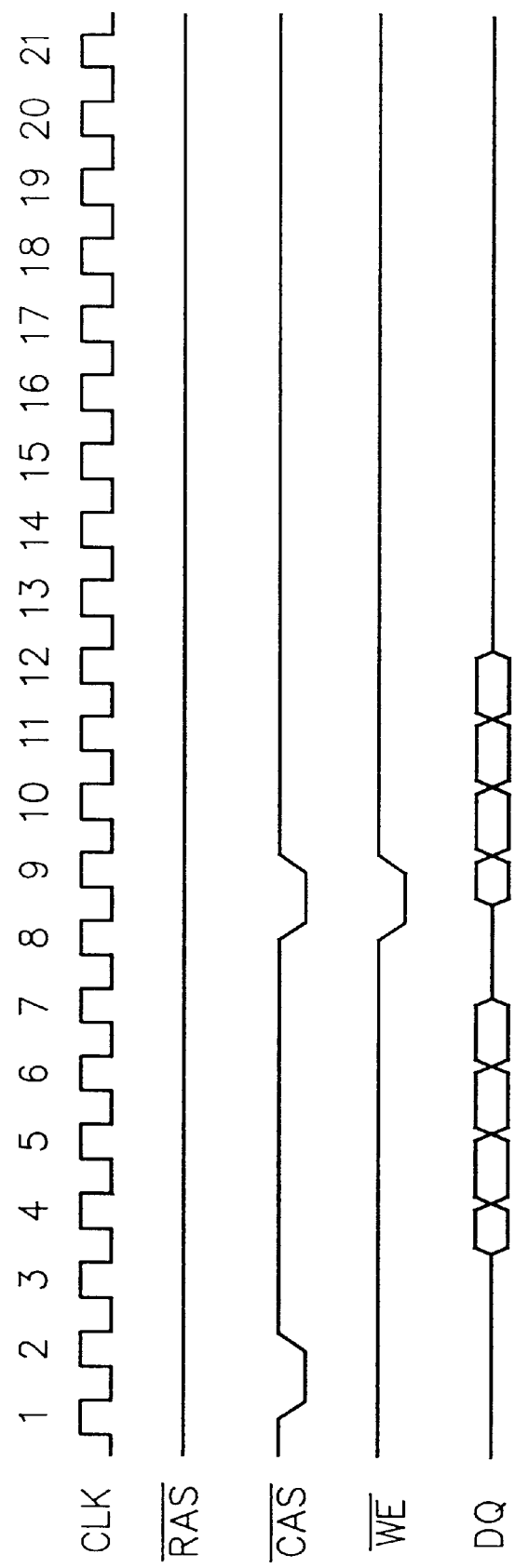
FIG. 7 is a timing chart showing an example of the operation waveforms in case of a page hit in an SDRAM memory controller.

An example of page control of the memory controller 3 according to this embodiment will be explained next with reference to timing charts shown in FIGS. 7, 8, and 9, in comparison with the prior art. FIG. 7 shows the waveforms in case of a page hit. Referring to FIG. 7, after a column address strobe signal /CAS goes low to be active at the second cycle of a clock signal CLK, data DQ is read out from the main memory 4 from the fourth cycle.

After that, when the column address strobe signal /CAS and a write enable signal /WE go low to be active at the ninth cycle of the clock signal CLK, the data DQ is written in the main memory 4. In case of FIG. 7, since the second write access to the main memory 4 is made with respect to the same page as the first readout access, a page hit occurs without any overhead.

Figure 8:
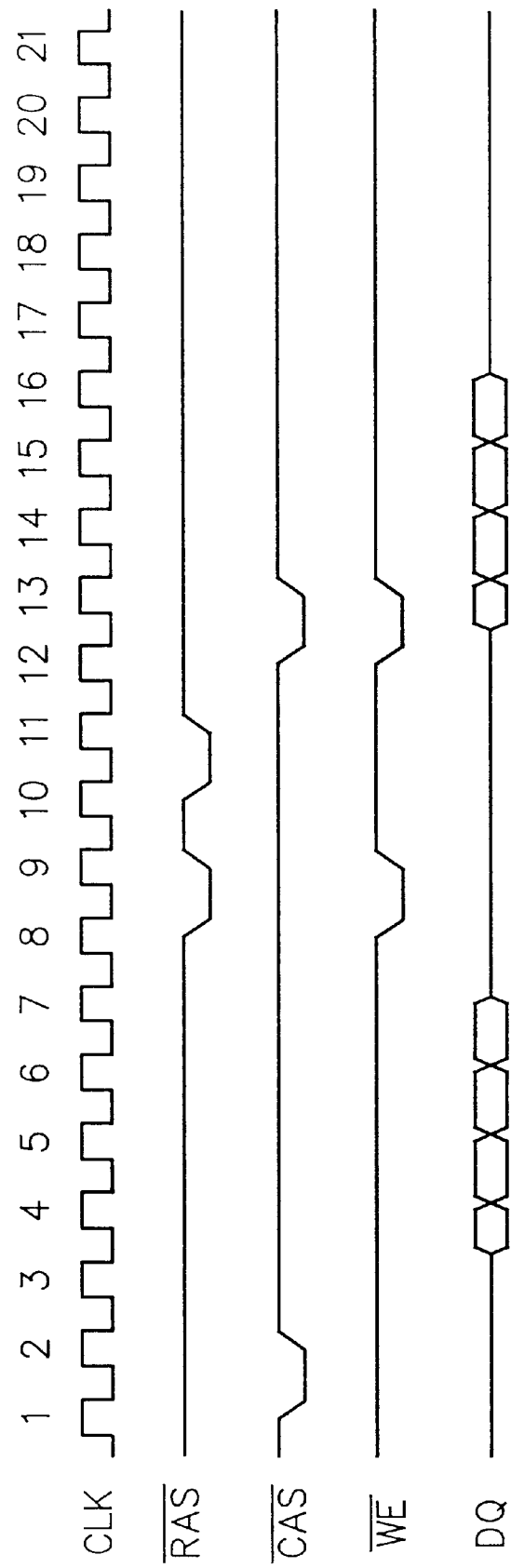
FIG. 8 is a timing chart showing an example of the operation waveforms in case of a page miss in a conventional SDRAM memory controller.

FIG. 8 shows the waveforms in page control by the conventional memory controller. Referring to FIG. 8, a page miss occurs at the ninth cycle of a clock signal CLK, and precharging is done when a row address strobe signal /RAS and a write enable signal /WE go low. After that, the row address strobe signal /RAS goes low at the 11th cycle after completion of precharging, and another page is activated. Furthermore, when a column address strobe signal /CAS and the write enable signal /WE go low at the 13th cycle, data DQ is written in another page of the main memory 4.

In this way, when a page miss occurs, writing the data DQ is completed at the 16th cycle, and overhead for four cycles arises in comparison with the case of page hit in which the write access is completed at the 12th cycle. In this portion alone, nearly 33% overhead arises. But, all cycles are not filled with only such accesses. When cache replacements frequently take place upon interrupt response or task switch, nearly 20% overhead arises.

Figure 9:
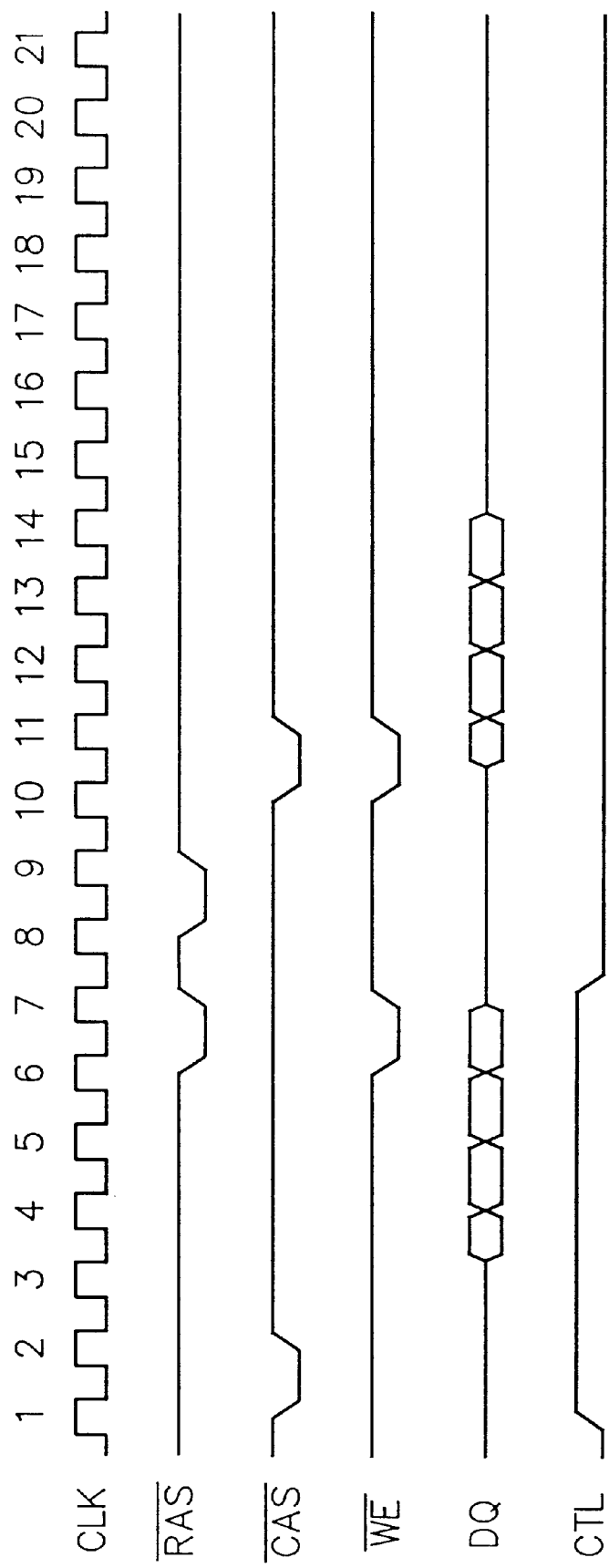
FIG. 9 is a timing chart showing an example of the operation waveforms in case of a page miss in an SDRAM memory controller according to the first embodiment of the present invention.

FIG. 9 shows the waveforms in page control according to this embodiment in which precharging is done immediately after a read access followed by a store-back access. Referring to FIG. 9, after a column address strobe signal /CAS goes low to be active at the second cycle of a clock signal CLK, data DQ is read out from the main memory 4 from the fourth cycle. This read access corresponds to the operation of (2) shown in FIG. 5. Before the execution of this read access, a page control signal CTL goes high to be active in response to a replacement of dirty entry detected by the replacement detection/notification circuit 11.

When the row address strobe signal /RAS and write enable signal /WE go low at the seventh cycle corresponding to the final stage of the read access while the page control signal CTL is at high level, precharging is done (the precharge instruction can be issued at the final stage of the access in terms of SDRAM specifications). When the read operation is completed, the page control signal CTL goes low.

After that, the row address strobe signal /RAS goes low at the ninth cycle after completion of precharging, so as to activate another page. Furthermore, when the column address strobe signal /CAS and write enable signal /WE go low at eleventh cycle, data DQ is written in another page in the main memory 4. This write access corresponds to the operation of (3) shown in FIG. 5.

According to the page control of this embodiment, since precharging is done in the read operation, the write access to another page in the main memory 4 is completed at the 14th cycle, and so overhead is reduced to two cycles in comparison with the case of FIG. 8. In other words, overhead can be halved in comparison with the conventional method, and reduced to around 10% even when cache replacements frequently occur upon interrupt response or task switch. In those cases, however increased the cache size is, cache misses can not be avoided. Hence, in those cases, this embodiment is superior to increasing the cache size in terms of improving the performance.

The second embodiment of the present invention will be described below. The first embodiment mentioned above is a case of one main memory (for example, only one DRAM bank). But, in some cases, a plurality of DRAMs may be connected. Or, like an SDRAM, a chip includes a plurality of banks, and different pages can be simultaneously activated if they are present on different banks. In the latter case, the DRAM can be accessed as if there were a plurality of DRAMs in the chip.

Figure 10:
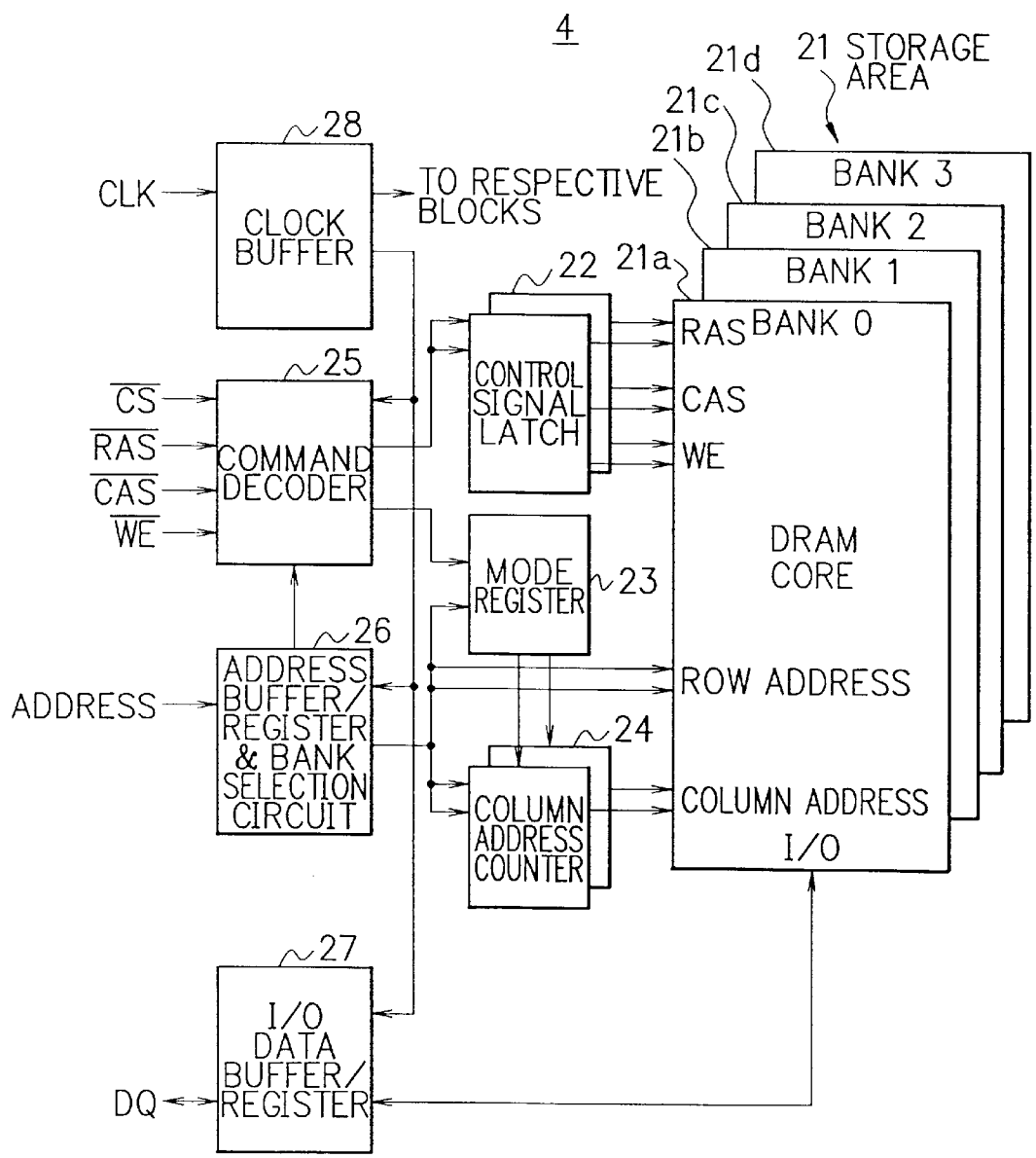
FIG. 10 is a schematic block diagram showing the arrangement of an SDRAM used in the second embodiment of the present invention.

This second embodiment is applied to a system that has a plurality of DRAMs, and can issue access requests to any of those memories. FIG. 10 shows the arrangement of an SDRAM as an example of main memory 4 used in a memory control system (computer system) according to the second embodiment. The SDRAM shown in FIG. 10 comprises a storage area 21 consisting of a plurality of banks 21a to 21d. These banks 21a to 21d may be provided on different chips or a single chip.

Read/write access, active/idle switching control of each page, and the like are done on the basis of control signals supplied from a control signal latch circuit 22 to three terminals RAS, CAS, and WE. The control signal latch circuit 22 latches control signals generated by decoding a chip select signal /CS, a row address strobe signal /RAS, a column address strobe signal /CAS, and a write enable signal /WE by a command decoder 25.

When a page is activated or precharged to the idle state in each of the banks 21a to 21d, the location on a memory cell array is designated based on an address externally supplied to an address buffer/register & bank selection circuit 26. In this case, the page is designated by selecting a word line in accordance with an upper row address supplied from the address buffer/register & bank selection circuit 26 to the banks 21a to 21d.

When data is read out from or written in the banks 21a to 21d, the location on the memory cell array is also designated based on an address externally supplied to the address buffer/register & bank selection circuit 26. In this case, a word line is selected in accordance with an upper row address supplied from the address buffer/register & bank selection circuit 26 to the banks 21a to 21d, and a bit line is selected in accordance with a lower column address supplied via a column address counter 24.

When a plurality of banks 21a to 21d to be selected by a chip select signal are connected like this embodiment, an externally input address generally contains not only a column address in a lower portion, and a row address in a portion upper than the column address, but also, identification information indicating a bank to be accessed, in a portion upper than the row address. The address buffer/register & bank selection circuit 26 selects a bank on the basis of the identification information contained in the address.

Data DQ to be read out or written according to the address externally supplied to the address buffer/register & bank selection circuit 26 is input from or output to an external circuit via an I/O data buffer/register 27.

Note that the SDRAM used in this embodiment has various operation modes. The count operation of the column address counter 24 is appropriately controlled in accordance with mode control signals supplied from the command decoder 25 and address buffer/register & bank selection circuit 26 via a mode register 23.

The aforementioned blocks operate in synchronism with a clock signal CLK externally supplied to a clock buffer 28.

In the system in which the main memory 4 comprises a plurality of DRAMs (banks), when a replacement of dirty entry is performed, if the read address of new data to be loaded into the cache memory 2 and the write address of the entry to be replaced are located on different chips (different banks in case of SDRAM), no precharge is necessary in the chip (bank) containing the destination of the earlier read access, and the page selected at that time is preferably kept active.

More specifically, if the accessed page is precharged simply by detecting occurrence of replacement of dirty entry in the cache memory 2 like the first embodiment, when the destinations of the earlier read access and the succeeding write access are located on different chips (banks), unnecessarily precharging is done. This causes a decrease in access speed.

In order to avoid this problem, in this second embodiment, address comparison is made in the cache memory 2 with divided upper and lower addresses. The location to divide is changed in accordance with the size of DRAM connected. In this case, the address is divided so that the upper address portion contains identification information indicating a chip (bank) to access. It is thereby judged that an access having a different upper addresses from that corresponding to an entry to be replaced is for a chip (bank) different from that containing the entry.

In case of detecting that the current access is to a different chip (bank), the cache memory 2 controls the replacement detection/notification circuit 11 not to output a page control signal instructing the memory controller 3 to precharge the read-accessed page. With this control, unnecessarily precharging can be avoided, and faster access to the main memory 4 can be attained as a whole.

Figure 11A:
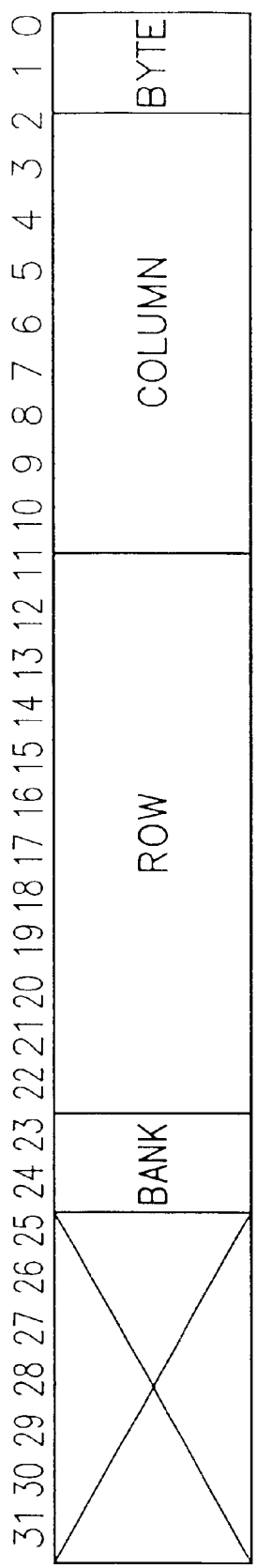
FIGS. 11A and 11B are imaginary views for illustrating address assignment used in the second embodiment.

Address assignment used in this embodiment will be described below with reference to FIGS. 11A and 11B. For example, when the main memory 4 uses four 8-bit wide 64-Mbit SDRAMs connected via a 32-bit bus, a 32-bit address is divided as shown in FIG. 11A.

The 0th and 1st bits on the LSB side are used for designating read/write in units of bytes. The 2nd to 10th bits are used as a column address to be output to the SDRAM. The 11th to 22nd bits are used as a row address to be output to the SDRAM. The 23rd and 24th bits are used as a bank address for designating a bank, which is also output to the SDRAM. Note that the 25th to 31st bits on the MSB side of the bank address are not used.

Figure 11B:
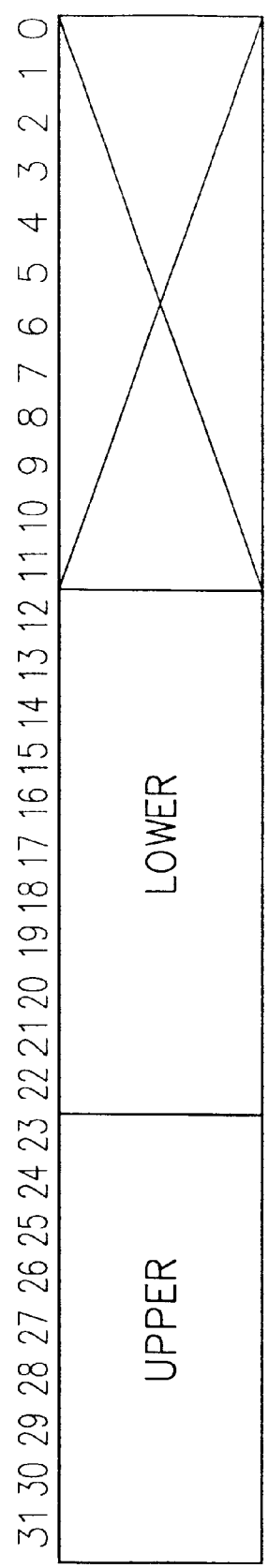

In case that the arrangement of the cache memory 2 is 16 Kbytes/4 ways (4 Kbytes/way: each way has the arrangement shown in FIG. 2), address comparison is done with respect to the 12th to 31st bits, as shown in FIG. 11B. The address comparison is done with dividing the address into the 12th to 22nd bits (lower address) and the 23rd to 31st bits (upper address) in accordance with the DRAM size. Note that the 0th to 11th bits are not used in this address comparison on the cache.

After the address comparison is done as shown in FIG. 2 using the upper and lower addresses shown in FIG. 11B, when the upper and lower addresses coincides with those of the aimed address, a cache hit occurs, and the corresponding data can be input/output only by accessing the cache memory 2.

When the addresses do not coincide, a cache miss occurs, and the oldest entry which has not been accessed for the longest time in the cache memory 2 is selected and replaced by new data. If the entry to be replaced is not dirty ("dirty" means that the data of the entry has been rewritten to be different from the corresponding part in the main memory 4), new data is read out from the main memory 4 to update the entry of the cache memory 2.

When the entry to be replaced is dirty, a replacement must be done, in which the data of the entry is written out in the main memory 4, and other data is read out from the main memory 4 to update the entry of the cache memory 2. When the replacement is executed, in this embodiment, if the upper addresses (23rd to 31st bits) of successive accesses coincide with each other, the successive accesses are to an identical chip (bank), so a page control signal is output from the replacement detection/notification circuit 11 for precharging and the cache entry is replaced, like the first embodiment.

On the other hand, even when the entry to be replaced is dirty, if the upper addresses (23rd to 31st bits) do not coincide with each other, the successive accesses are to different chips (banks), so no page miss occurs on the main memory 4 in those accesses. Hence, in this case, the cache entry is replaced without the replacement detection/notification circuit 11 asserting any page control signal indicating that the current access is attendant upon a replacement of dirty entry.

As described above, according to the second embodiment, even when a dirty entry is replaced, if successive accesses made for the replacement are to different memories in the main memory 4, precharging the earlier accessed page is not performed. Unnecessarily precharging can be avoided therefore. This brings about a faster access speed to the main memory 4 as a whole even in a system comprising a plurality of memories.

Note that the arrangements, operations, and the like of the individual units described in the above embodiments are only for examples of the present invention, and the technical scope of the present invention must not be construed to be limited by them. The present invention contains various changes and modifications of the above embodiments without departing from the spirit and principal feature of the invention.

For example, in the above embodiments, a signal to be output when a replacement of dirty entry is detected uses a dedicated page control signal. But, if a signal line indicating the type of access request has a margin for bit assignment, a type indicating that a store-back access (write access attendant upon a replacement of dirty entry) follows the current access may be added as one of the access types.

In the above embodiments, a DRAM (more specifically an SDRAM) is used as an example of the main memory 4. But, the present invention can be applied to any other memories as long as they have a fast page mode.

In the second embodiment descried above, a control is made not to assert any page control signal when it is judged that successive accesses are to different banks in the main memory 4. But, the memory controller 4 may be informed that no page miss will occur.

The page control of each of the above embodiments is implemented by hardware such as a sequencer. But, the page control flow shown in FIG. 6 may be implemented by running a program stored in the ROM 5 or RAM 4 shown in FIG. 4, for example. Note that the ROM 5 or RAM 4 may be connected to the CPU 1 via a bus 16 shown in FIG. 12, and the program may be stored in them. A program that makes the computer operate to provide the aforementioned functions may be recorded on a recording medium such as a CD-ROM, and the page control may be implemented with the program installed in the computer. As the recording medium, in addition to the ROM, RAM, and CD-ROM mentioned above, a floppy disk, a hard disk, a magnetic tape, a magnetooptical disk, a nonvolatile memory card, and the like may be used.

When the functions of each of the above embodiments are implemented not only by executing the supplied program to the computer but also by executing the program in cooperation with an OS (operating system) or another application software that is running on the computer, or when those functions are implemented by executing some or all of the processes of the supplied program by an function expansion board or unit of the computer, such program is included in the embodiments of the present invention.

According to the present invention, when an access made to a main memory is attendant upon a replacement of dirty entry in a cache device, the currently active page in the main memory is precharged to return to the idle state when the earlier access is completed. Time waste due to overhead upon cache replacements can be shortened thereby. In particular, when the present invention is applied to a computer system, time waste due to overhead can be greatly shortened even when cache replacements frequently takes place upon interrupt response or task switch, and a faster access speed to the memory can be attained.

According to another feature of the present invention, when access is made to the main memory attendant upon a replacement of dirty entry in the cache device, and successive accesses attendant upon the replacement are made to the same one of main memories, the currently active page in the main memory is precharged to return to the idle state when the earlier access is completed. In this case, even when a dirty entry in the cache device is replaced, if successive accesses attendant upon the replacement are made to different main memories, respectively, the currently active page is not precharged in any of the main memories when the corresponding earlier access is completed. Unnecessarily precharging is thereby avoided, and so time waste due to overhead can be shortened.

According to still another feature of the present invention, when a signal indicating that the current access is attendant upon a replacement of dirty entry in a cache device, is supplied from the cache device to a memory controller, the signal can be included in a signal that indicates the type of access to the main memory. Hence, no dedicated signal line need be assigned in addition to existing signal lines, and the circuit scale can be prevented from increasing.

What is claimed is:

1. A memory controller for controlling access to a main memory, said controller having a mode for keeping the accessed page in said main memory active even after the access is completed, and said controller comprising state control circuit for controlling to precharge the accessed page in said main memory to return to the idle state upon completion of preceding access on condition that access to said main memory is attendant upon a replacement of dirty entry in a cache device.

2. A memory controller for controlling access to a plurality of main memories, said controller having a mode for keeping the accessed page in one of said main memories active even after the corresponding access is completed, and said controller comprising state control circuit for controlling to precharge the accessed page in one of said main memories to return to the idle state upon completion of preceding access on condition that successive accesses attendant upon a replacement of dirty entry in a cache device are made to the same one of said main memories.

3. A memory control system comprising a store-back cache device located between a CPU and a main memory, and a memory controller which is connected to said cache device to control access to said main memory, wherein said memory controller has a mode for keeping the accessed page in said main memory active even after the access is completed, said cache device comprises detection/notification circuit for detecting occurrence of replacement of dirty entry, and sending a signal to said memory controller to indicate whether or not the current access to said main memory is attendant upon said replacement, and said memory controller comprises state control circuit for controlling to precharge the accessed page in said main memory to return to the idle state upon completion of preceding access to said main memory when said memory controller receives said signal from said cache device to indicate the access attendant upon said replacement.

4. A system according to claim 3, wherein said detection/notification circuit sends said signal in a state of being included in a signal for indicating a type of access to said main memory.

5. A memory control system comprising a store-back cache device located between a CPU and a plurality of main memories, and a memory controller which is connected to said cache device to control access to said main memories, wherein said memory controller has a mode for keeping the accessed page in one of said main memories active even after the corresponding access is completed, said cache device comprising detection/notification circuit for detecting occurrence of replacement of dirty entry and a condition that successive accesses attendant upon said replacement are made to the same one of said main memories, to send a signal to said memory controller for indicating whether or not the current access to said one of said main memories is attendant upon said replacement, and said memory controller comprises state control circuit for controlling to precharge the accessed page in said one of said main memories to return to the idle state upon completion of preceding access when said memory controller receives said signal from said cache device to indicate the access attendant upon said replacement.

6. A memory control method for controlling access to a main memory in a computer system which comprises a store-back cache device and a memory controller having a mode for keeping the accessed page in said main memory active even after the access is completed, said method comprising:

a first step of detecting occurrence of replacement of dirty entry in said cache device; and a second step of making said memory controller control to precharge the accessed page in said main memory to return to the idle state upon completion of preceding access to said main memory attendant on said replacement when said replacement of dirty entry is detected.

7. A method according to claim 6, further comprising, between said first and second steps, a step of making said cache device send a signal to said memory controller, said signal indicating whether or not the current access to said main memory is attendant upon said replacement.

8. A memory control method for controlling access to a plurality of main memories in a computer system which comprises a store-back cache device and a memory controller having a mode for keeping the accessed page in one of said main memories active even after the corresponding access is completed, said method comprising the steps of:

detecting occurrence of replacement of dirty entry in said cache device, and a condition that successive accesses attendant upon said replacement are made to the same one of said main memories; and making said memory controller control to precharge the accessed page in said one of said main memories to return to the idle state upon completion of preceding access to said main memory attendant on said replacement when said occurrence of the replacement and the successive accesses to the same one of said main memories are detected.

9. A recording medium that records a program to operate a computer system comprising a store-back cache device located between a CPU and a main memory, and a memory controller which is connected to said cache device to control access to said main memory, said memory controller having Ma mode for keeping the accessed page in said main memory active even after the access is completed, said program making said computer system function as:

means for detecting occurrence of replacement of dirty entry in said cache device, and then informing said memory controller; and means for making said memory controller control to return the accessed page in said main memory to the idle state upon completion of preceding access to said main memory attendant on said replacement when said memory controller is informed of a detection occurrence of said replacement of dirty entry.

10. A recording medium that records a program to operate a computer system comprising store-back cache device located between a CPU and a plurality of main memories, and a memory controller which is connected to said cache device to control access to said main memories, said memory controller having a mode for keeping the accessed page in one of said main memories active even after the corresponding access is completed, said program making said computer system function as:

means for detecting occurrence of replacement of dirty entry in said cache device and a condition that successive accesses attendant upon said replacement are made to the same one of said main memories, for making said cache device inform said memory controller; and means for making said memory controller control to return the accessed page in said one of said main memories to the idle state upon completion of preceding access attendant on said replacement when said memory controller is informed by said cache device.

11. A memory controller for controlling access to a memory, said controller having a mode for keeping the accessed page in said memory active even after the access is completed, and said controller comprising state control circuit for controlling to precharge the accessed page in said memory to return to the idle state upon completion of preceding access on condition that access to said memory is attendant upon a replacement of dirty entry in a cache device.

12. A memory controller for controlling access to a plurality of memories, said controller having a mode for keeping the accessed page in one of said memories active even after the corresponding access is completed, and said controller comprising state control circuit for controlling to precharge the accessed page in one of said memories to return to the idle state upon completion of preceding access on condition that successive accesses attendant upon a replacement of dirty entry in a cache device are made to the same one of said memories.

13. A memory control system comprising a store-back cache device located between a CPU and a memory, and a memory controller which is connected to said cache device to control access to said memory, wherein said memory controller has a mode for keeping the accessed page in said memory active even after the access is completed, said cache device comprises detection/notification circuit for detecting occurrence of replacement of dirty entry, and sending a signal to said memory controller to indicate whether or not the current access to said memory is attendant upon said replacement, and said memory controller comprises state control circuit for controlling to precharge the accessed page in said memory to return to the idle state upon completion of preceding access to said memory when said memory controller receives said signal from said cache device to indicate the access attendant upon said replacement.

14. A system according to claim 13, wherein said detection/notification circuit sends said signal in a state of being included in a signal for indicating a type of access to said memory.

15. A memory control system comprising a store-back cache device located between a CPU and a plurality of memories, and a memory controller which is connected to said cache device to control access to said memories, wherein said memory controller has a mode for keeping the accessed page in one of said memories active even after the corresponding access is completed, said cache drive comprising:

detection/notification circuit for detecting occurrence of replacement of dirty entry and a condition that successive accesses attendant upon said replacement are made to the same one of said memories, to send a signal to said memory controller for indicating whether or not the current access to said one of said memories is attendant upon said replacement, and said memory controller comprises state control circuit for controlling to precharge the accessed page in said one of said memories to return to the idle state upon completion of preceding access when said memory controller receives said signal from said cache device to indicate the access attendant upon said replacement.

16. A memory control method for controlling access to a memory in a computer system which comprises a store-back cache device and a memory controller having a mode for keeping the accessed page in said memory active even after the access is completed, said method comprising:

a first step of detecting occurrence of replacement of dirty entry in said cache device; and a second step of making said memory controller control to precharge the accessed page in said memory to return to the idle state upon completion of preceding access to said memory attendant on said replacement when said replacement of dirty entry is detected.

17. A method according to claim 16, further comprising, between said first and second steps, a step of making said cache device send a signal to said memory controller, said signal indicating whether or not the current access to said memory is attendant upon said replacement.

18. A memory control method for controlling access to a plurality of memories in a computer system which comprises a store-back cache device and a memory controller having a mode for keeping the accessed page in one of said memories active even after the corresponding access is completed, said method comprising the steps of:

detecting occurrence of replacement of dirty entry in said cache device, and a condition that successive accesses attendant upon said replacement are made to the same one of said memories; and making said memory controller control to precharge the accessed page in said one of said memories to return to the idle state upon completion of preceding access to said memory attendant on said replacement when said occurrence of the replacement and the successive accesses to the same one of said memories are detected.

19. A recording medium that records a program to operate a computer system comprising a store-back cache device located between a CPU and a memory, and a memory controller which is connected to said cache device to control access to said memory, said memory controller having a mode for keeping the accessed page in said memory active even after the access is completed, said program making said computer system function as:

means for detecting occurrence of replacement of dirty entry in said cache device, and then informing said memory controller; and means for making said memory controller control to return the accessed page in said memory to the idle state upon completion of preceding access to said memory attendant on said replacement when said memory controller is informed of a detection occurrence of said replacement of dirty entry.

20. A recording medium that records a program to operate a computer system comprising a store-back cache device located between a CPU and a plurality of memories, and a memory controller which is connected to said cache device to control access to said memories, said memory controller having a mode for keeping the accessed page in one of said memories active even after the corresponding access is completed, said program making said computer system function as:

means for detecting occurrence of replacement of dirty entry in said cache device and a condition that successive accesses upon said replacement are made to the same one of said memories, for making said cache device inform said memory controller; and means for making said memory controller control to return the accessed page in said one of said memories to the idle state upon completion of preceding access attendant on said replacement when said memory controller is informed by said cache device.

* * * * *